E. B. ANDERSON.
NUT LOCK.
APPLICATION FILED MAR. 21, 1911.
1,107,473.
Patented Aug. 18, 1914.
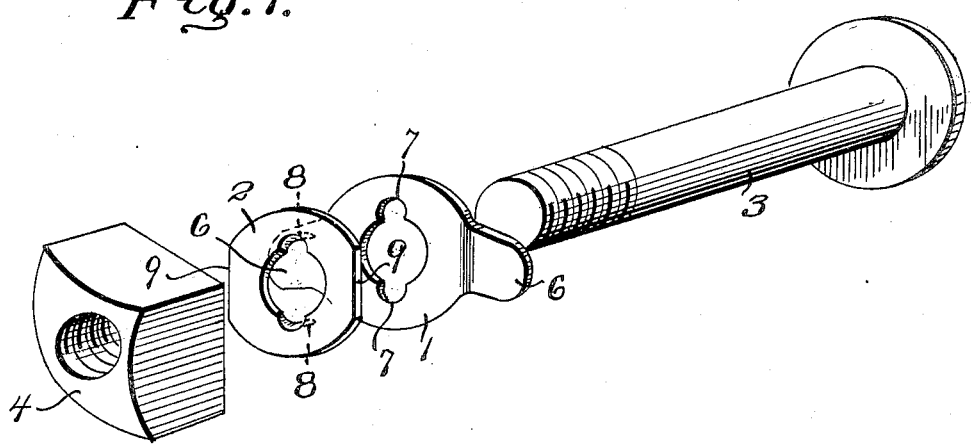
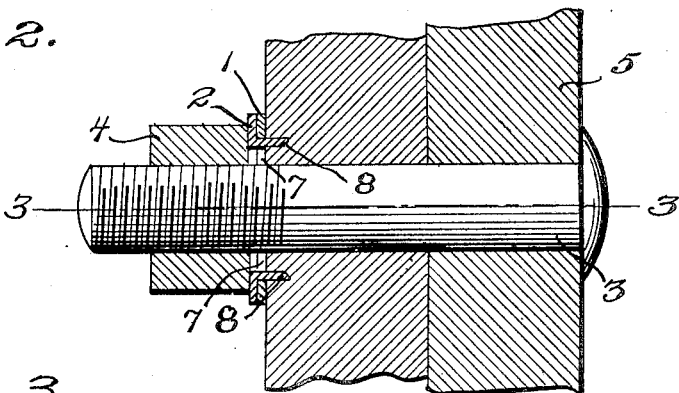
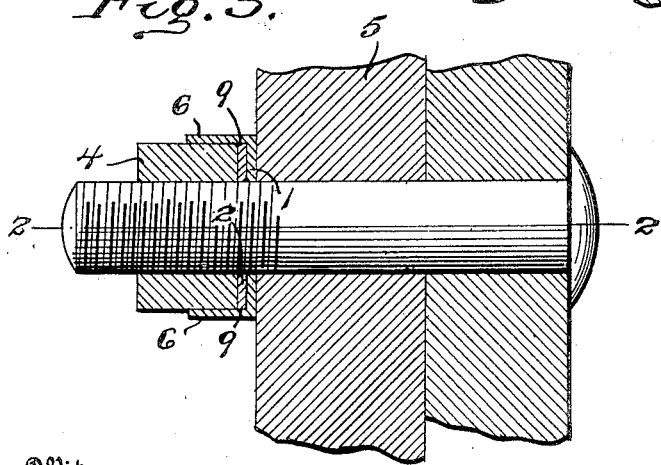
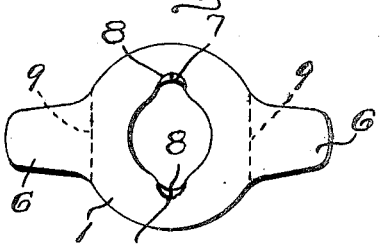
Witnesses
Inventor
E.B.Anderson
By Attorneys

UNITED STATES PATENT OFFICE.

ELIAS B. ANDERSON, OF ROCK FALLS, ILLINOIS.

NUT-LOCK.

1,107,473.  Specification of Letters Patent.  Patented Aug. 18, 1914.

Application filed March 21, 1911. Serial No. 615,894.

*To all whom it may concern:*

Be it known that I, ELIAS B. ANDERSON, citizen of the United States, residing at Rock Falls, in the county of Whiteside and State of Illinois, have invented certain new and useful Improvements in Nut-Locks, of which the following is a specification.

The present invention comprehends certain new and useful improvements in nut locks, and the object of the invention is to provide a particularly simple and inexpensive device of this character which is thoroughly reliable and efficient in operation and which may be applied to a nut and bolt of the ordinary form.

With this and other objects in view, as will more fully appear as the description proceeds, the invention consists of certain constructions, arrangements and combinations of the parts that I shall hereinafter fully describe and claim.

For a full understanding of the invention, reference is to be had to the following description and accompanying drawing, in which:

Figure 1 is a perspective view showing the parts of my improved nut lock in juxtaposition; Fig. 2 is a longitudinal section of the nut lock applied to the work, the section being taken on line 2—2 of Fig. 3. Fig. 3 is a similar view with the section taken on line 3—3 of Fig. 2; and, Fig. 4 is a face view showing the washers interlocked.

Corresponding and like parts are referred to in the following description and indicated in all the views of the accompanying drawing by the same reference characters.

My improved nut lock consists essentially of a pair of co-acting lock washers 1 and 2, which are of annular form and which are designed to be slipped on a bolt 3 between the nut 4 and the work 5, the washer 1 being next to the work and the washer 2 being next to the nut. The bolt and nut are preferably of the ordinary type.

The lock washer 1 is provided on its periphery at substantially diametrically opposite points with outstanding integral ears 6 that initially lie in the plane of the washer, the washer being constructed of pliable material in order to enable the ears to be bent into angular positions, as hereinafter described. In the inner edge of the washer, that is, the walls of its bolt-receiving opening, there are diametrically opposite seating recesses 7 that are spaced apart in a direction substantially perpendicular to the direction of the length of the ears 6. The other lock washer, designated 2, is formed of relatively rigid metal and has its inner edge portion pressed substantially perpendicularly inwardly into the respective seating recesses 7 to constitute spurs 8 which establish an interlocking connection between the two washers in order to prevent one of the washers from turning on the bolt relative to the other. The spurs project beyond the inner face of the washer 1 and are suitably pointed, as shown, to be capable of penetrating hard substances. The outer edge of the washer 2 is curved and follows the contour of the washer 1, except in proximity to the ears 6, where it is flattened to provide parallel side edges 9. These edges are substantially straight and extend transversely with respect to the length of the ears. It is to be noted that the distance between the edges is equal to the distance between opposite peripheral faces of the nut 4.

In practice, when the nut is tightened the washers are pressed firmly against each other and against the work, thereby retaining the spurs in position in the seating recesses to maintain the washers in interlocking engagement. The tightening of the nut also serves to force the pointed extremities of the spurs into the work so that both of the washers are positively held against turning movement on the bolt. When finally screwed home the nut is arranged so that two of its opposite peripheral faces register with the respective side edges 9. The ears 6 are then bent perpendicularly outwardly to lie against the side edges 9 and the said faces of the nut. The ears are of sufficient size to obtain a broad bearing on the nut, and therefore retain the nut securely in adjusted position against possible accidental loosening on the bolt under the influence of vibration or jar or the like. With this arrangement the nut is locked directly to the work, and the necessity for providing teeth or similar devices for biting into and upsetting the threads of the bolt, is obviated. Inasmuch as the ears fit against the side edges 9, they tend to hold the two washers against turning movement relative to each other. The provision of these parallel side edges 9 is quite an important feature of the invention, and is very desirable from a practical standpoint on account of the fact that the edges serve as guides to insure the ears being bent along the proper lines. The object of having the seating recesses 7 located midway between the ears, is to prevent the washer 1 from being unduly weakened at the juncture of the ears with the body portion of the washer. The ears are therefore rendered capable of being bent into and out of operative positions without the liability of being broken off.

From the foregoing description in connection with the accompanying drawing, it will be apparent that I have provided an improved nut lock which is simple, durable and strong in construction, which is quite efficient in operation, and which in nowise mutilates the nut or bolt.

The device is susceptible of general application and may be advantageously employed on rail joints or jarring machinery or the like. Each of the washers constituting the nut lock may be stamped from sheet metal, whereby to permit the invention to be easily and cheaply manufactured and to enhance its practical value. It is to be understood that two or more spurs may be provided on the washer 2 for interlocking the washer 1, and also that some of the washers 2 may be made of hardened material, while others may be formed of pliable metal, according as desired.

What I claim is:

A nut lock comprising an annular washer formed of pliable material and provided at its outer periphery and at diametrically opposite sides with nut engaging tongues, the washer being formed at diametrically opposite points in its inner periphery with notches located midway between the tongues whereby the portions of the washer at the opposite sides of a median line passing longitudinally through the tongues are of the same configuration and dimensions, and an annular washer formed of non-pliable material and having at diametrically opposite sides parallel straight peripheral edge portions to coöperate with the tongues upon the first mentioned washer, the last mentioned washer at diametrically opposite points upon its inner periphery and midway the said parallel portions, being struck up to form pointed entering spurs located outwardly of the circle described by the inner periphery of the washer and adapted to enter the notches in the inner periphery of the first mentioned washer when the two washers are assembled, the spurs being of a length greater than the thickness of the first mentioned washer and portions of the last mentioned washer at the opposite sides of a plane passing through the median long dimension of the spurs being of the same configuration and dimensions.

In testimony whereof I affix my signature in presence of two witnesses.

ELIAS B. ANDERSON. [L. S.]

Witnesses:
D. UNDERWOOD,
V. G. LIMERICK.